(12) United States Patent
Gedevanishvili et al.

(10) Patent No.: US 8,586,819 B2
(45) Date of Patent: Nov. 19, 2013

(54) DISPOSABLE ABSORBENT POD

(75) Inventors: Shalva Gedevanishvili, Richmond, VA (US); William R. Sweeney, Richmond, VA (US); Heidi R. Kleinbach-Sauter, Manakin Sabot, VA (US); Zane Gibbs, Richmond, VA (US)

(73) Assignee: Philip Morris USA Inc., Richmond, VA (US)

(*) Notice: Subject to any disclaimer, the term of this patent is extended or adjusted under 35 U.S.C. 154(b) by 0 days.

(21) Appl. No.: 13/073,518

(22) Filed: Mar. 28, 2011

(65) Prior Publication Data

US 2012/0047642 A1 Mar. 1, 2012

Related U.S. Application Data

(63) Continuation of application No. 12/850,013, filed on Aug. 4, 2010, now abandoned.

(60) Provisional application No. 61/231,228, filed on Aug. 4, 2009.

(51) Int. Cl.
*A61F 13/15* (2006.01)

(52) U.S. Cl.
USPC .............................. 604/359; 604/360; 4/283

(58) Field of Classification Search
USPC ......... 604/359, 360, 368, 385.19; 4/261, 283; 428/34.3
See application file for complete search history.

(56) References Cited

U.S. PATENT DOCUMENTS

| | | | |
|---|---|---|---|
| 967,368 A | 8/1910 | Grigsby | |
| 2,057,846 A | 9/1934 | Rohrmann | |
| 2,017,926 A | 10/1935 | Solar | |
| 2,578,324 A | 12/1951 | Southwick, Jr. | |
| 2,635,742 A | 4/1953 | Swartz et al. | |
| 3,990,872 A | 11/1976 | Cullen | |
| 4,159,549 A | 7/1979 | Layton, Jr. | |
| 4,162,547 A | 7/1979 | Jenkins | |
| 4,628,547 A | 12/1986 | Baker | |
| 4,748,069 A | 5/1988 | Cullen | |
| 4,858,250 A | 8/1989 | Lee | |
| 4,908,882 A | 3/1990 | Williams et al. | |
| 5,013,309 A | 5/1991 | Baigas, Jr. et al. | |
| 5,116,139 A | 5/1992 | Young et al. | |
| 5,135,787 A | 8/1992 | Bair | |
| 5,356,678 A | 10/1994 | Heitzhaus et al. | |
| 5,832,543 A | 11/1998 | Bosserman | |
| 6,491,993 B1 | 12/2002 | Forbes et al. | |
| 7,230,154 B2 * | 6/2007 | Sigurjonsson | 602/55 |
| 2003/0119172 A1 * | 6/2003 | Hsieh et al. | 435/263 |
| 2004/0257397 A1 | 12/2004 | Gomez et al. | |
| 2006/0101564 A1 | 5/2006 | Powdermaker | |
| 2007/0029006 A1 | 2/2007 | Lampropoulos | |
| 2008/0295235 A1 | 12/2008 | Taras | |

* cited by examiner

*Primary Examiner* — Lynne Anderson
(74) *Attorney, Agent, or Firm* — Buchanan Ingersoll & Rooney PC

(57) ABSTRACT

Absorbent pods comprise a pouch formed of a porous material. The pouch contains an absorbent polymer in an amount sufficient to absorb at least about 20 mL of fluid. Preferably, the absorbent polymer is sodium polyacrylate and the porous material is a hydrophilic material. The absorbent pods absorb and retain fluids, including saliva.

13 Claims, 5 Drawing Sheets

DISPOSABLE ABSORBENT POD

CROSS REFERENCE TO RELATED APPLICATION

This application is a continuation application of U.S. application Ser. No. 12/850,013 entitled DISPOSABLE ABSORBENT POD, filed on Aug. 4, 2010 now abandoned which claims priority under 35 U.S.C. §119(e) to U.S. Provisional Application No. 61/231,228, filed on Aug. 4, 2009, the entire content of each is incorporated herein by reference.

SUMMARY

Provided are disposable absorbent pods for placement and use in a spittoon. The disposable absorbent pods comprise a pouch formed entirely of a porous material; and an absorbent polymer contained within the pouch. The absorbent polymer is included in an amount sufficient to absorb at least about 20 mL of fluid. Preferably, the absorbent pod is biodegradable.

Preferably, the porous material is formed of a material selected from the group consisting of fabric, paper, polymeric materials and combinations thereof. Also preferably, the porous material is synthetic or organic. In a preferred embodiment, the porous material is hydrophilic. The porous material can also include at least one additive selected from the group consisting of at least one colorant, at least one deodorant and/or fragrance, at least one disinfectant, germicide and/or antiviral and combinations thereof. Preferably, the porous material has a wet tensile strength with the polymer orientation in Machine Direction (MD) of up to about 4,000 g/in and a wet tensile strength with the polymer orientation in Cross Direction (CD) of up to about 1,100 g/in. The porous material has a dry tensile strength MD of up to about 3,700 g/in and a dry tensile strength CD of up to about 900 g/in. In an embodiment, the porous material is a polyethylene or polypropylene film with about 1% to about 2% maleic anhydride added to the polymer to create hydrophilic acid groups on the surface thereof and having uniform, round pores formed therein. In other embodiments, the porous material is 100% polyester interlock.

Preferably, the absorbent polymer is sodium polyacrylate. The sodium polyacrylate is in a form selected from the group consisting of powders, granules, beads and combinations thereof. Also, the sodium polyacrylate powder has at least one linear dimension of about 0.5 micron to about 2 mm. Preferably, the absorbent polymer is included in the disposable pod in an amount of about 0.5 g to about 5.0 g. The absorbent polymer can be included in an amount sufficient to absorb about 20 mL to about 70 mL of fluid, more preferably about 60 mL to about 70 mL of fluid.

In an embodiment, the absorbent pod has an accordion shape and is formed of paper.

In a preferred embodiment, the absorbent pod further includes a coating. The coating is formed of a substance selected from the group consisting of surfactants, mucolytics and combinations thereof.

Also provided is a spittoon comprising: a container having a hollow body and at least one opening therein; a disposable absorbent pod contained within the container. The disposable absorbent pod comprises a pouch and an absorbent polymer contained within the pouch. The absorbent polymer is included in an amount sufficient to absorb at least about 20 mL of fluid.

Also provided is a method of making a disposable absorbent pod. The method comprises feeding a porous material along a feed path; folding the porous material into a tubular formation; forming a longitudinal seam along overlapping edges of the porous material; forming a lower transverse seam across the tubular formation; placing a portion of an absorbent polymer into the tubular formation above the transverse seam; and forming an upper transverse seam across the tubular formation to enclose the absorbent polymer. The method can also include coating the porous material with at least one of a surfactant or a mucolytic and drying the coating.

DETAILED DESCRIPTION

Typically, adult oral tobacco users expel saliva and tobacco particles during use into a vessel, such as a cup, bottle, spittoon and/or cuspidor. Often, the vessel can be overturned during and/or after use such that the saliva is spilled. Thus, tobacco users often place a napkin lining in the vessel prior to use to help absorb the saliva. However, the absorption capacity of napkins is such that only a small amount of the saliva is actually absorbed. In addition, disposal of the soiled napkin can be messy. Thus, a sanitary spit absorption apparatus and method is desirable.

Provided is a disposable absorbent pod for placement in a vessel for absorption of saliva during use of moist smokeless tobacco. In a preferred embodiment, the disposable absorbent pod absorbs and retains saliva so that the pod can easily be removed from the vessel, if desired, and disposed of without mess. In other embodiments, the absorbent pod contains an absorbent polymer before use and allows for the absorbent polymer to expand out of the pod during and after use. The disposable absorbent pod is formed so as to be fully biodegradable after use and disposal. In other embodiments, the disposable absorbent pod, or portions thereof such as some of the porous material, can at least partially disintegrate during use.

As used herein, the term "vessel" refers to cups, bottles, spittoons, cuspidors, and any other container having a hollow body and at least one opening therein.

Figure 1:
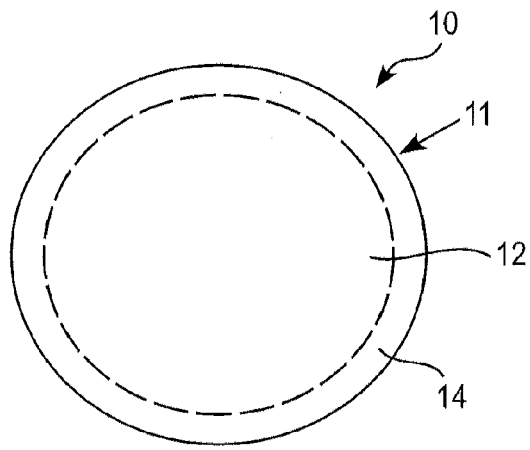
FIG. 1 is a top view of a disposable absorbent pod having a circular shape.
Figure 2:
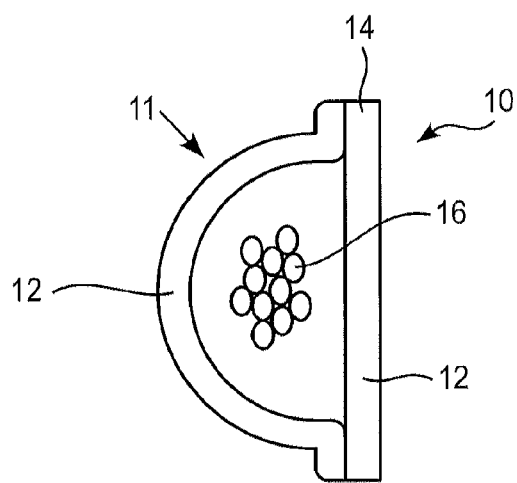
FIG. 2 is a cross-sectional view of the disposable absorbent pod of FIG. 1.

In a preferred embodiment, as shown in FIG. 1, the absorbent pod 10 comprises a pouch 11 formed of a porous material 12. The porous material 12 forms all major surfaces of the absorbent pod 10 such that the absorbent pod 10 can absorb fluids from the top, bottom, and/or sides of the absorbent pod 10. Also preferably, the porous material 12 is hydrophilic and insoluble, non-dissolvable and/or non-disintegrable during use. The pouch 11 contains an absorbent polymer 16 (shown in FIG. 2) in an amount sufficient to absorb a desired amount of saliva. Preferably, the absorbent polymer 16 is capable of absorbing fluids and retains the fluids during and after use of the absorbent pod 10. Preferably, the porous material 12 does not tear during use and remains sealed so as to fully contain the absorbent polymer 16 before, during and after use. In an alternative embodiment, the porous material 12 of the pod separates at seals 14 thereof to allow the absorbent polymer 16 to expand out of the pod 10.

As used herein, the term "fluids" refers to saliva, water, phlegm and the like. The term fluids can also include any low viscosity fluid that can be absorbed and retained by the absorbent polymer.

In a preferred embodiment, the porous material 12 is a fabric, paper, such as filter paper, or insoluble polymeric material. Preferably, the porous material 12 has sufficient strength to completely contain the absorbent polymer 16 as it absorbs fluid and consequently expands during use. Thus, the porous material 12 does not tear before, during and/or after use, and can contain the absorbent polymer 16. In other embodiments, the porous material 12 may allow the absorbent polymer 16 to expand out of the pod 10 as it absorbs fluids. However, when the absorbent polymer 16 expands out of the pod 10, preferably, the porous material 12 maintains its integrity and the absorbent polymer 16 expands out of the pod 10 at one or more locations where the seals 14 are separated.

The porous material 12 can be a woven or non-woven material and combinations thereof. Preferably, the porous material 12 does not dissolve and/or disintegrate during use of the absorbent pod 10 so as to fully contain the absorbent polymer 16 and any fluids absorbed therein during and after use. Alternatively, the porous material 12 does not dissolve and/or disintegrate during use of the absorbent pod 10 so as to fully contain the absorbent polymer 16 prior to absorption of saliva by the absorbent polymer 16. However, preferred porous materials 12 are biodegradable when disposed.

Also preferably, the pores of the porous material 12 are sufficiently small to prevent powders, such as absorbent polymers in the form of powder, from leaking out of the pod 10. In addition, the pores are sufficiently large to allow the passage of fluids, particularly saliva, into the pod 10 so as to be absorbed and retained by the absorbent polymer 16. Preferably, the porous material 12 is wettable and/or permeable to saliva and/or tobacco spit.

Various parameters, including denier of the material, the length of the channels through the material, the tortuosity of the channels and the hydrophilic properties of the material can be factors in choosing a porous material 12 that allows passage of saliva therethrough. Since saliva has long mucin glycoproteins, which make it a non-Newtonian fluid with a very high static viscosity, the proteins can get caught on small rough microstructures thereby increasing the localized viscosity even further. Thus, it is preferred that the porous material 12 have uniform, round pores with very smooth edges that are sized to be slightly smaller than the powder granules of the absorbent polymer 16.

Thus, the porous material 12 is also preferably a near monolayer of a very thin hydrophilic polymer with uniform, round pores. For example, the porous material 12 can be an enhanced flow membrane, such as a polyethylene or polypropylene film with about 1% to about 2% maleic anhydride added to the polymer to create hydrophilic acid groups on the surface thereof. These films could then be pierced to form uniform, round pores suitable for the passing of saliva through the films.

Also preferably, the porous material 12 has sealed edges and/or edges that do not unravel. If the absorbent pod 10 includes one or more seals 14, each seal can be formed by heat, ultrasonic methods, crimping, adhesives and any other method. Preferably, the seal 14 extends around at least a portion of the perimeter of the porous material 12 so that the absorbent polymer 16 is fully contained within the pouch 11. In an alternative embodiment, the seal 14 can be formed using a water soluble polymer that allows for the pod 10 to separate at the seals 14 as the absorbent polymer 16 absorbs saliva so as to allow the absorbent polymer 16 to escape the pod 10.

In a preferred embodiment, the porous material 12 is an elastic fabric so that the fabric can stretch to accommodate the saturated absorbent polymer 16 during and after use. The fabric can be organic, synthetic, or include blends of organic and synthetic materials. The fabric can be cellulosic. Preferred fabrics include, without limitation, 100% polyester interlock. Preferably, the fabric has an open structure such that fluids including saliva can pass into the absorbent pod 10. Also preferably, the porous material 12 is hydrophilic, such that fluids are drawn to the porous material 12 so that the fluids will pass through the fabric and be absorbed by the absorbent polymer 16.

In an alternative embodiment, the porous material 12 is an inelastic material, such as paper, which does not expand as the absorbent polymer 16 absorbs fluids. When using an inelastic material, the internal volume of the pod 10 can be maximized to accommodate the expanding absorbent polymer 16. Alternatively, the pod 10 can be designed to separate at seals 14 as the absorbent polymer 16 expands so as to allow for the release of the absorbent polymer 16. In such an embodiment, the seal 14 is formed with water soluble adhesive, such that the seal 14 breaks as the absorbent polymer 16 expands. Also preferably, the water soluble adhesive 14 is applied uniformly around the edges of the pod 10 so that the top portion of the pod 10 is maintained on top of the absorbent polymer 16 as the absorbent polymer 16 expands. Thus, any indicia on the pod 10 remains visible during use of the pod 10.

Additionally, the porous materials 12 used to form the pouch 11 can be provided with predetermined levels for basis weight and/or wet strength in order to minimize and/or prevent breakage of the pouch 11 during storage, use and/or disposal of the absorbent pod 10. The porous material 12 can have a wet tensile strength with the polymer orientation in Machine Direction (MD) of up to about 4,000 grams per inch (g/in) and a wet tensile strength with the polymer orientation in Cross Direction (CD) of up to about 1,100 g/in. The porous material can have a dry tensile strength MD of up to about 3,700 g/in and a dry tensile strength CD of up to about 900 g/in. Preferably, the weakest porous material 12 used is conventional coffee filter paper or similar materials. Also preferably, the porous material 12 is strong enough to retain the absorbent polymer 16 during and after use of the absorbent pod 10.

In a preferred embodiment, the absorbent polymer 16 is a hydrophilic polymer, such as sodium polyacrylate. Sodium polyacrylate is a super absorbent polymer that can absorb at least about 100 times its weight in water and retain the water in the form of a gel. Preferably, the super absorbent polymer gels upon contact with fluids such that the fluid is completely absorbed and encapsulated by the gel. Thus, the fluid is not released therefrom, but is retained within the gel. In other embodiments, other super absorbent polymers can be used in lieu of or in addition to sodium polyacrylate.

Preferably, the sodium polyacrylate is in the form of a finely divided powder having a high surface area so as to quickly absorb fluids. Preferably, the particles of the absorbent powder range in size from about 0.5 microns to about 2 mm. The sodium polyacrylate can include agglomerated particles. In other embodiments, the sodium polyacrylate can have a bead and/or granular form. By providing a high surface area powder, the powder is able to more quickly absorb fluids as they reach dry powder within the absorbent pod 10.

In addition, not wishing to be bound by theory, it is believed that the use of the powder form allows for fluids to travel past areas of powder that have already absorbed fluid and gelled to reach dry powder that can absorb the remaining fluid. It is also believed that the geometry of the powder can influence the absorption characteristics of the sodium polyacrylate. Preferable sodium polyacrylates can have various macro-structures and/or differences in cross-linking.

The amount of absorbent polymer 16 used can vary depending on the necessary absorption capacity of the absorbent pod 10. In an embodiment, the absorbent polymer 16 can be included in an amount of about 0.5 g to about 5.0 g (e.g. about 1.0 g to about 4.5 g, about 1.5 g to about 4.0 g, about 2.0 g to about 3.5 g or about 2.5 g to about 3.0 g) so as to absorb about 20 mL to about 100 mL of fluid or about 20 mL to about 120 mL of fluid (about 20 mL to about 90 mL, about 30 mL to about 80 mL, about 40 mL to about 70 mL or about 50 mL to about 60 mL). For example, in a preferred embodiment, the absorbent polymer 16 is included in an amount of 2.25 g to as to be capable of absorbing about 60 mL to about 70 mL, preferably about 65 mL of fluid. The absorbent polymer 16 can be varied depending on the necessary absorption capacity for the intended use of the absorbent pod 10.

After formation, the absorbent pod 10 including the porous material 12 and the absorbent polymer 16 weighs about 2 g to about 6 g depending on the amount of absorbent polymer 16 contained therein (e.g., about 2.5 g to about 5.5 g, about 3.0 g to about 5.0 g or about 3.5 g to about 4.5 g).

Preferably, the absorbent pod 10 is sized and configured to fit in the bottom of a cup or bottle. Also preferably, the absorbent pod 10 is sized so that it can be folded to fit through the opening of a bottle without getting stuck. If the absorbent pod 10 is too large, a user will be unable to place the pod 10 within a bottle. However, the absorbent pod 10 must also be sized to accommodate expansion of the absorbent polymer 16 as it absorbs and retains fluids during use. In a preferred embodiment, absorbent pods with a round, disk-like shape have a diameter of about 1 inches to about 4 inches, preferably about 3 inches so that the absorbent pods 10 can lie flat on the bottom of the vessel in which the absorbent pod 10 is placed.

The following example is given to illustrate embodiments of the absorbent pod 10 and should not be construed to limit the scope of such embodiments.

Example 1

To form an absorbent pod, about 2.25 g of sodium polyacrylate is placed at a central location on a round piece of 100% polyester interlock having a diameter of about 5 inches. A second round piece of 100% polyester interlock having a diameter of about 3 inches is placed on top of the first round piece and a seal is formed between the first and second round pieces around the perimeter of the round pieces to contain the sodium polyacrylate therein and form an absorbent pod such that the diameter of the absorbent pod is about 3 inches. The first and second round pieces of 100% polyester interlock weigh about 1.25 g so that the absorbent pod weights about 3.5 g.

The absorbent pod 10 can be formed in any shape. Suitable shapes include, without limitation, pouch-shape, crescent, half-moon, round, disk, D-shaped, dumpling shaped, rhombus, trapezoid, ellipsis, rectangle, heart, square, oval, sphere, and the like.

In a preferred embodiment, the porous material 12 can be colored. Preferably, the porous material 12 can be dyed a brown color so as to camouflage the tobacco infused spit of moist smokeless tobacco users. In an embodiment, the color of the porous material 12 can be heathered so as to provide a camouflage type pattern to the absorbent pod 10. In other embodiments, the absorbent pod 10 can be colored in stripe, dot or other patterns. In addition, the absorbent pod 10 can be dyed in any color and/or combination of colors. The dye can be an organic or synthetic dye. In other embodiments, the absorbent polymer 16 can also be dyed. Images, advertisements, logos and the like can also be printed on the absorbent pod 10.

Preferably, deodorants can be included in the absorbent pod 10. The deodorants can be incorporated into the porous material 12 or into the absorbent polymer 16 of the pod. The deodorants can be included in an amount sufficient to deodorize the saturated absorbent pod 10. For example, the absorbent pod 10 can include sodium bicarbonate as a deodorant.

In an embodiment, the absorbent pod 10 can include fragrances and aromas. Suitable fragrances and aromas include, but are not limited to, tobacco, smoke, menthol, mint, such as peppermint and spearmint, chocolate, licorice, citrus and other fruit fragrances, such as lemon and orange, vanillin, spice aromas such as cinnamon, methyl salicylate, linalool, bergamot oil, geranium oil, lemon oil, and ginger oil, food aromas, floral aromas, such as rose, and combinations thereof. In a preferred embodiment, the absorbent pod 10 includes fragrances that mimic those of moist smokeless tobacco products, which users may find pleasing. In other embodiments, the absorbent pod 10 includes fragrances that mask those of moist smokeless tobacco products. The fragrances and aromas can be included in an amount sufficient to mask the odor of the saliva. In other embodiments, the fragrances and aromas are included in an amount sufficient to add a complimentary smell to the tobacco infused saliva in addition to the smell of the moist smokeless tobacco.

In a preferred embodiment, the absorbent pod 10 includes disinfectants, germicides and/or antivirals. The disinfectants, germicides and/or antivirals can be mixed with the absorbent polymer 16 and contained within the pouch 11. Alternatively, the porous material 12 can be impregnated with disinfectants, germicides and/or antivirals. The disinfectants, germicides and/or antivirals can be used in an amount sufficient to kill bacteria, germs and/or viruses that may be found in fluids, such as saliva. The amount used may also depend on the concentration of the disinfectants, germicides and/or antivirals. For example, more concentrated disinfectants, germicides and/or antivirals can be used in smaller amounts than less concentrated disinfectants, germicides and/or antivirals. Suitable disinfectants include household type disinfectants, such as quaternary ammonium.

Preferably, in use, the absorbent pod 10 lies flat on the bottom of the vessel in which it is placed. Thus, as the fluids, such as saliva, pass to the bottom of the vessel, the absorbent pod 10 will absorb and retain the fluid. Once the user has finished using the absorbent pod 10, the absorbent pod 10 can be discarded leaving no fluid behind.

Figure 3:
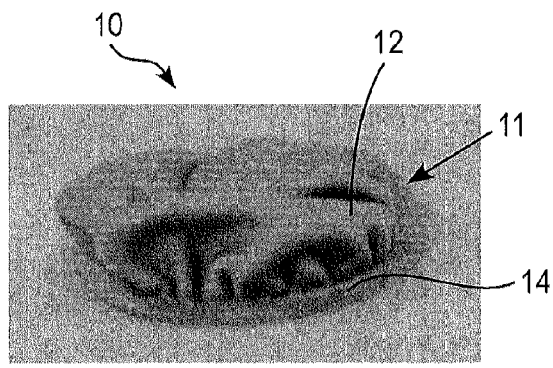
FIG. 3 is a photograph of a dry disposable absorbent pod prior to use.

As shown in FIG. 3, when dry, the absorbent pod 10 has a deflated appearance because the amount of absorbent polymer 16 contained within the absorbent pod 10 does not stretch or fully fill the porous material 12 used to form the absorbent pod 10. As such, the absorbent polymer 16 has room to expand as it absorbs fluid during use. In addition, since the porous material is preferably elastic, the material can stretch as the absorbent polymer 16 absorbs fluid to accommodate the increased mass of the saturated absorbent polymer 16.

Figure 4:
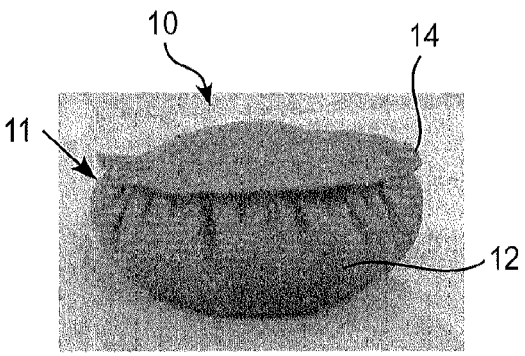
FIG. 4 is a photograph of the disposable absorbent pod of FIG. 3 after full saturation.

As shown in FIG. 4, when fully saturated, the absorbent pod 10 has an inflated appearance due to the absorption of fluid resulting in formation of a gel with the sodium polyacrylate. For example, an absorbent pod 10 weighing about 3.5 g and including about 1.25 g of porous material 12 and 2.25 g of absorbent polymer 16, can weigh about 60 g to about 70 g after saturation such that as much as 90% of the weight of the saturated absorbent pod 10 is fluid. The increased volume of the saturated absorbent polymer 16 causes the porous material 12 to expand to accommodate the fluid.

Figure 5:
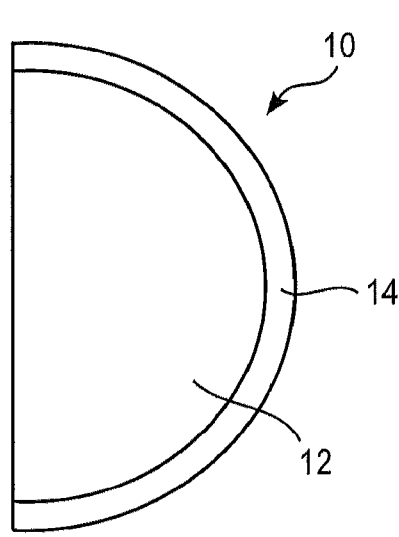
FIG. 5 is a top view of a disposable absorbent pod having a D-shape.
Figure 6:
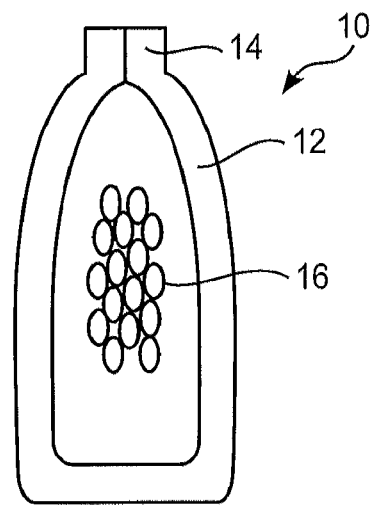
FIG. 6 is a cross-sectional view of the disposable absorbent pod of FIG. 3.

As shown in FIG. 5, in an embodiment, the absorbent pod 10 can have a D-shape. The D-shaped absorbent pod 10 can include a single piece of porous material 12, as described above, that is folded in half, filled with the absorbent polymer 16 (shown in FIG. 6) and sealed only around the open edges of the porous material 12 to form the absorbent pod 10. Alternatively, the absorbent pod 10 can include two D-shaped pieces of porous material 12 that include a seal 14 around the entire perimeter of the porous material 12 after placing a quantity of the absorbent polymer 16 therein.

Figure 7:
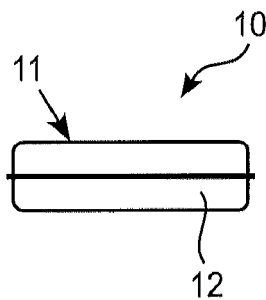
FIG. 7 is a side view of a dry disposable absorbent pod having an accordion construction.
Figure 8:
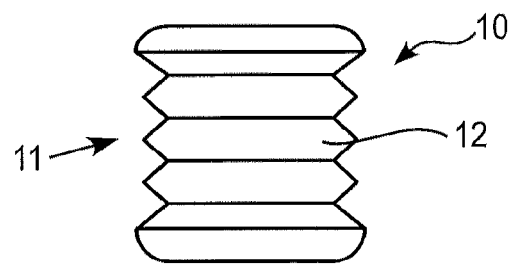
FIG. 8 is side view of a fully saturated disposable absorbent pod having an accordion construction.

In another embodiment, the absorbent pod 10 can be formed of a porous material 12 in an accordion shape, that when dry appears flat as shown in FIG. 7. Such a shape may be preferred when using non-elastic or less elastic porous materials 12 to form the pouch 11 of the absorbent pod 10 because less elastic materials may not be able to expand to accommodate the increased volume of the absorbent polymer 16 as it absorbs fluids during use. For example, the accordion shaped pouch can be formed of filter paper by forming folds with the paper prior to forming the pouch. Thus, as the absorbent polymer 16 contained within the pouch absorbs fluid and expands, the pouch 11 can expand at the folds of the accordion as shown in FIG. 8.

Figure 14:
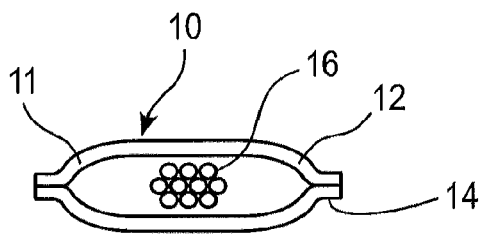
FIG. 14 is a cross-sectional view of a disposable absorbent pod formed by two circular disks of porous material.

As shown in FIG. 14, in a preferred embodiment, the absorbent pod 10 can have a generally circular shape and can be formed of two generally circular shaped pieces of porous material 12, as described above. A seal 14 can be formed around the open edges of the porous material 12 to form a pouch 11 and to contain the absorbent polymer 16. Also preferably, the absorbent pod 10 contains a predetermined quantity of absorbent polymer 16. Moreover, the porous material can be an inelastic material and the absorbent polymer 16 can separate at the seals 14 and expand out of the pod 10 as the absorbent polymer 16 absorbs fluids.

Figure 15:
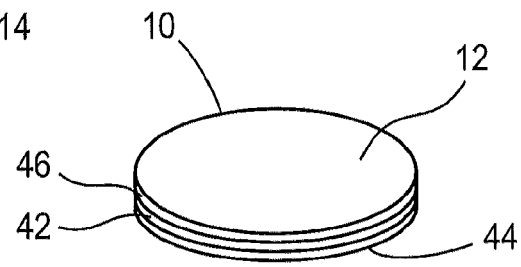
FIG. 15 is a perspective view of a disposable absorbent pod having a generally circular shape.
Figure 16:
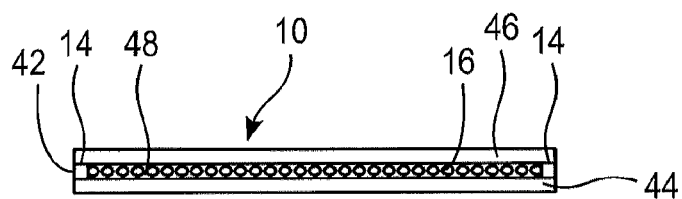
FIG. 16 is a cross-sectional view of the disposable absorbent pod of FIG. 15 including two circular disks and at least one sidewall.

As shown in FIG. 15 and FIG. 16, the disposable absorbent pod 10 has a generally cylindrical shape and can include a top disk 46, a bottom disk 44, and at least one sidewall 42 extending between the top disk 46 and the bottom disk 34. Seals 14 can be formed between the at least one sidewall 42 and each of the top disk 46 and the bottom disk 44. The internal volume 48 of the pod 10 can be adjusted based on the height of the sidewall 42. Preferably, the height of the sidewall 42 ranges from about 1 mm to about 10 mm. Also preferably, the height of the sidewall 42 is chosen to accommodate a desired quantity of absorbent polymer 16. If desired, the pod 10 can be formed of an inelastic material and the internal volume 48 can be minimized so as to allow the absorbent polymer 16 to expand out of the pod 10 as the absorbent polymer 16 absorbs saliva as discussed above. Alternatively, the internal volume 48 of the pod 10 can be maximized to accommodate and contain the absorbent polymer 16 as it expands.

Figure 17:
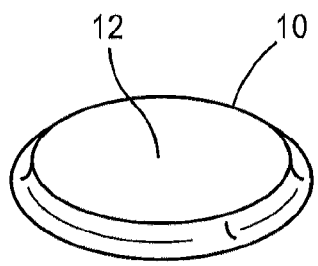
FIG. 17 is a perspective view of a disposable absorbent pod having a generally circular shape.
Figure 18:
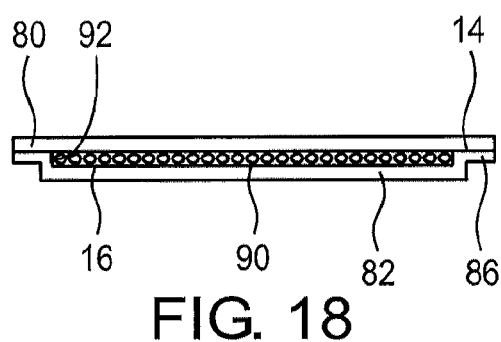
FIG. 18 is a cross-sectional view of the disposable absorbent pod of FIG. 17 including a flat circular disk and a plate.

As shown in FIG. 17 and FIG. 18, a disposable absorbent pod 10 can have a generally circular shape and can be formed of a top disk 80 and a bottom plate 82 having a fixed construction. Also preferably, the plate 82 can be substantially rigid, firm and/or flexible. The bottom plate 82 can include a bottom portion 90 and at least one sidewall 92 that define an internal volume. Preferably, the top disk 80 can be sealed to a rim 86 of the bottom plate 82 to form a seal 14. The height of the at least one sidewall 92 ranges from about 1 mm to about 10 mm. Also preferably, the height of the sidewall 42 is chosen to accommodate a desired quantity of absorbent polymer 12. If desired, the pod 10 can be formed of an inelastic material and the internal volume can be minimized so as to allow the absorbent polymer 16 to expand out of the pod 10 as the absorbent polymer 16 absorbs saliva as discussed above. Alternatively, the internal volume of the pod 10 can be maximized to accommodate and contain the absorbent polymer 16 as it expands.

Figure 19:
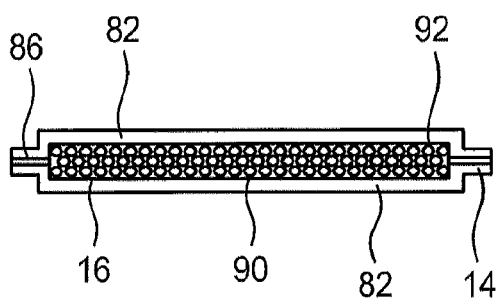
FIG. 19 is a cross-sectional view of the disposable absorbent pod formed of two plates.

As shown in FIG. 19, a disposable absorbent pod 10 can be formed of two plates 82 each having a fixed construction. Also preferably, the plate 82 can be substantially rigid, firm and/or flexible. Preferably, each plate 82 includes a bottom portion 90 and at least one sidewall 92 that define an internal volume. Preferably, the two plates 82 can be sealed to one another along a rim 86 on each plate 82 to form seal 14. Preferably, the rim 86 is integrally formed with the each plate 82. Also preferably, the height of the at least one sidewall 92 ranges from about 1 mm to about 10 mm. Moreover, the height of the sidewall 92 is chosen to accommodate a desired quantity of absorbent polymer 16. If desired, the pod 10 can be formed of an inelastic material and the internal volume can be minimized so as to allow the absorbent polymer 16 to expand out of the pod 10 as the absorbent polymer 16 absorbs saliva as discussed above. Alternatively, the internal volume of the pod 10 can be maximized to accommodate and contain the absorbent polymer 16 as it expands.

Figure 9:
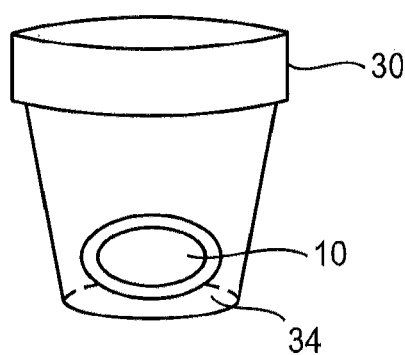
FIG. 9 is an illustration of a disposable absorbent pod placed in a cup.

As shown in FIG. 9, in an embodiment, the absorbent pod can be placed in a cup 30, such as a styrofoam cup, coffee cup or other type of cup. The pod 10 can be positioned such that the pod 10 covers the bottom 34 of the cup 30. The user can then expel saliva into the cup 30 so that the pod 10 can absorb the saliva. Once finished, the pod 10 can be dumped into a trash can or otherwise removed from the cup 30. Since some absorbent polymers 16, such as sodium polyacrylate, gel when saturated, the fluid is contained within the pod 10 and not squeezed out when handled. The cup 30 can then be easily washed and reused. Since the saliva is fully contained within the pod 10 during use, if the cup 30 is tipped over there is no risk of a spill.

Figure 10:
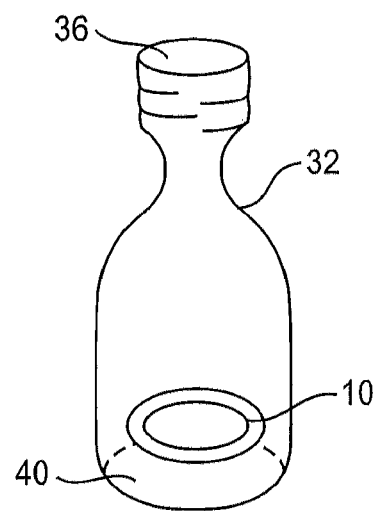
FIG. 10 is an illustration of a disposable absorbent pod placed in a bottle.

As shown in FIG. 10, the absorbent pod 10 can be placed in a bottle 32. To insert the pod 10 into the bottle 32, the user can fold the pod 10 in half, push the pod 10 through the opening 36 of the bottle 32, and allow the pod 10 to fall to the bottom 40 of the bottle 32. Once in place, the user can expel saliva into the bottle 32 through the opening 36 so that the pod 10 can absorb the saliva. When finished, the bottle 32 and pod 10 can be discarded.

In a preferred embodiment, the absorbent pods 10 can be packaged and sold in conjunction with moist smokeless tobacco products. The absorbent pods 10 can be formed to include the logo of the associated moist smokeless tobacco products or related tobacco products. In other embodiments, multiple absorbent pods 10 can be sold with a reusable spittoon. In yet another embodiment, a spittoon including one or more disposable absorbent pods can be combined with a container for moist smokeless tobacco products.

Figure 11:
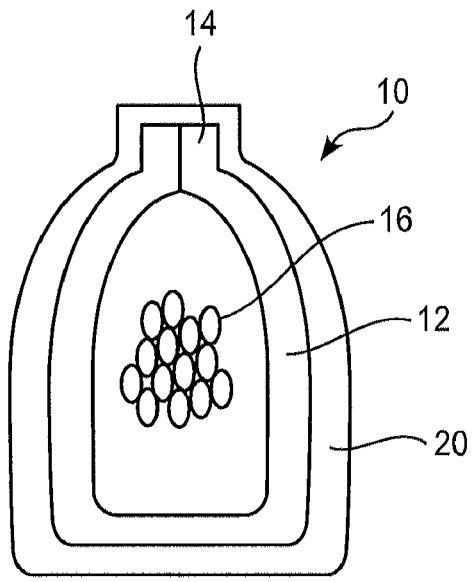
FIG. 11 is a cross-sectional view of a D-shaped absorbent pod including a coating.

In an embodiment, the absorbent pod 10 includes at least one coating 20, as shown in FIG. 11. Preferably, the coating 20 includes viscosity decreasing agents, such as mucolytics. For example, the coating can include at least one surfactant and/or at least one mucolytic enzyme that acts to ease the penetration of saliva into the absorbent pod 10. Because flow of saliva through the porous material 12 is largely determined by the viscosity of the saliva and the ability of the saliva to wet the porous material 12, a mechanism that decreases viscosity of the saliva can have an advantageous effect on the ability of the saliva to move across the barrier formed by the porous material 12, and thus have an advantageous effect on absorption of saliva by the absorbent pod 10.

Typically saliva is a non-Newtonian, thixotropic fluid, with a static velocity of about 15 cps at 25° C. (compared with 1 cps for room temperature water). If this static viscosity can be reduced, diffusion of saliva through porous material 12 will increase linearly with the static viscosity reduction. Because the viscosity and ability of saliva to wet porous substrates depends, at least in part, upon the level of glycoproteins and other proteins found in saliva, reducing the level of these proteins can decrease the viscosity, increase the ability to wet, and thus provide better penetration of a porous material 12.

The absorbent pods 10 described herein contain one or more mucolytic agents ("mucolytics") that can degrade one or more of the components typically found in saliva, and thus reduce the static viscosity of saliva, and make it more able to penetrate the porous material 12 of the absorbent pod 10. A mucolytic agent is an agent which at least partially dissolves mucous found in the saliva.

Mucolytics include protein cleaving enzymes and N-acetylcysteine and derivatives thereof (such as N-acetylcysteine L-lysinate and others described in U.S. Pat. No. 4,409,138, the entire content of which is incorporated herein by reference thereto). It is believed that such compounds reduce mucous viscosity by opening up the disulfide linkages in the mucous through sulfhydryl groups.

In a particular embodiment, the one or more mucolytics comprise proteolytic, or protein cleaving, enzymes. Suitable enzymes can include papain, bromelain, thiol-proteases, and other similar enzymes. Most preferably, the mucolytic is a proteolytic enzyme effective to degrade mucin, a component of saliva.

Proteolytic enzymes can be found in, e.g., naturally occurring botanical materials, such as pineapple juice or papaya juice, and in materials derived from these, such as concentrates, extracts, etc. Exemplary natural botanical sources for mucolytics include mugwort extract, clerodendrum extract, pineapple juice, and papaya juice. Preferably, a mucolytic agent is obtained by extraction, purification, and/or concentration from a botanical source.

In a preferred embodiment, the mucolytic agent associated with the absorbent pod 10 breaks down mucous in the saliva that contacts the mucolytic, causing the saliva to become thinner (lower static viscosity), less thixotropic, and/or more flowable. The resulting saliva is better able to penetrate the porous material 12 of the absorbent pod 10. Preferably, the mucolytic gent is included in the absorbent pod 10 in an amount sufficient to lower the viscosity of saliva.

In an embodiment, the coating 20 is applied to the porous material 12 as a solution, suspension and/or emulsion. For example, the desired ingredients of the coating 20 can be mixed to form a solution. Suitable methods for applying the coating 20 to the porous material 12 include spray, slot die and/or gravure application methods.

In a preferred embodiment, the coating 20 is added in an amount of about 1 $g/m^2$ to about 50 $g/m^2$ on a dry weight basis to the porous material 12. Preferably, the coating 20 on the porous material 12 is dried prior to forming absorbent pods 10 so as to avoid dampening the absorbent polymer 16.

Figure 12:
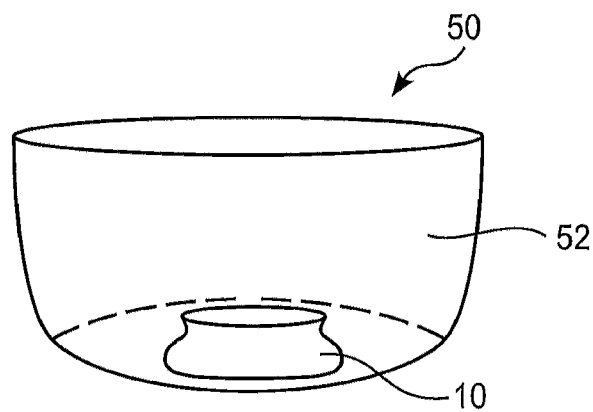
FIG. 12 is a cross-sectional view of a spittoon containing an absorbent pod.

As shown in FIG. 12, in an embodiment, a spittoon 50 contains an absorbent pod 10 in a hollow space 52 therein.

Figure 13:
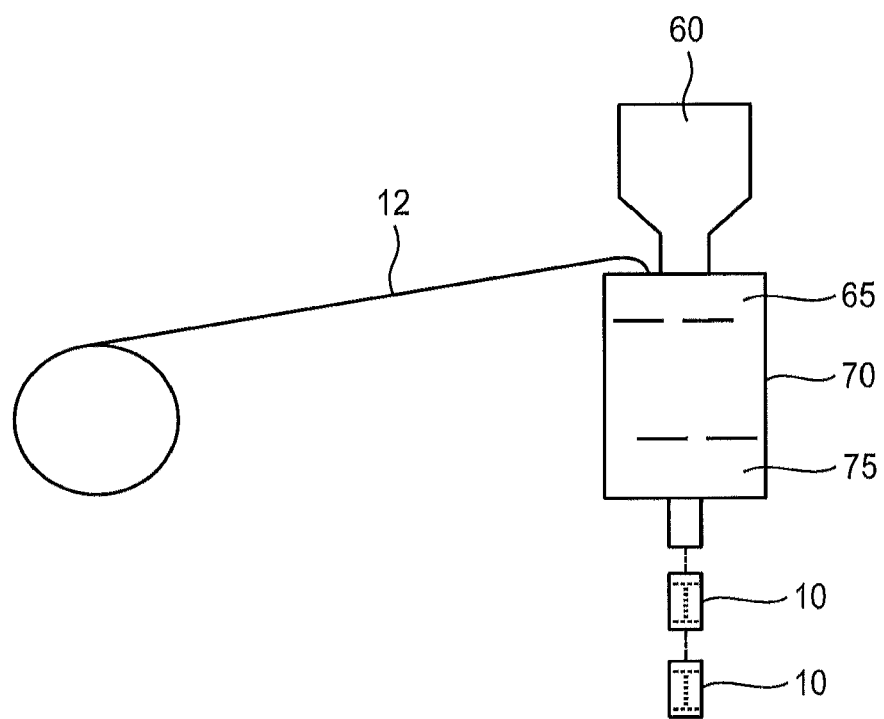
FIG. 13 is a schematic illustration of a machine for forming absorbent pods.

In an embodiment, as shown in FIG. 13, formation of the absorbent pods 10 can be executed by feeding a ribbon of porous material 12 through a poucher machine 70, such as those manufactured by Merz Verpackungsmaschinen GmbH, Lich, Germany. The poucher machine can be a high-speed poucher machine. The poucher machine can be a vertical or horizontal poucher machine. Such systems typically include a folding horn or shoe 65, a cutter 75 and a feeder 60, which cooperate to repetitively fold the ribbon of porous material 12 into a tube, close-off and seal an end portion of the tube, feed a measured amount of absorbent polymer into the closed-off tube to create a filled portion of the tube and seal and sever the filled portion of the tube to repetitively form absorbent pods 10.

In an embodiment, a coating 20 can be continuously applied to a side of the porous material 12.

Absorbent pods 10 can be continuously formed by introduction of predetermined amounts of the absorbent polymer 16 into the tubular form above a transverse seam, formation of an upper transverse seam above the filling and cutting the tubular formation at locations along the length of the tubular formation to form individual absorbent pods 10.

Sealing may be accomplished by any suitable sealing method, such as, for example, adhesive or by mutual sealing. Mutual sealing may be thermal or sonic. Preferably, sealing is accomplished by thermal sealing.

In this specification, the word "about" is often used in connection with numerical values to indicate that mathematical precision of such values is not intended. Accordingly, it is intended that where "about" is used with a numerical value, a tolerance of ±10% is contemplated for that numerical value.

While the foregoing describes in detail an absorbent pod and methods for forming and using absorbent pods with reference to a specific embodiment thereof, it will be apparent to one skilled in the art that various changes and modifications and equivalents to the absorbent pod and methods for forming and using absorbent pods may be employed, which do not materially depart from the spirit and scope of the invention.

We claim:

1. A disposable absorbent pod for placement and use in a vessel, said disposable absorbent pod comprising:
   a pouch formed entirely of a hydrophilic, insoluble, and elastic porous material;
   an absorbent polymer contained within the pouch and included in an amount sufficient to absorb at least about 20 mL of saliva; and
   a coating comprising at least one mucolytic agent on at least one surface of the pouch,
   wherein the pouch is operable to contain the absorbent polymer during use and the porous material is operable to stretch so as to accommodate and expand with the absorbent polymer during use and wherein the porous material is a polyethylene or polypropylene film with about 1% to about 2% maleic anhydride added to the polymer to create hydrophilic acid groups on the surface thereof and having uniform, round pores formed therein.

2. The disposable absorbent pod of claim 1, wherein the absorbent polymer is sodium polyacrylate and wherein the sodium polyacrylate is in a form selected from the group consisting of powders, granules, beads and combinations thereof.

3. The disposable absorbent pod of claim 2, wherein the sodium polyacrylate is a powder having at least one linear dimension of about 0.5 micron to about 2 mm.

4. The disposable absorbent pod of claim 1, wherein the absorbent polymer is included in the disposable pod in an amount of about 0.5 g to about 5.0 g.

5. The disposable absorbent pod of claim 1, wherein the absorbent polymer is included in an amount sufficient to absorb about 60 mL to about 120 mL of saliva.

6. The disposable absorbent pod of claim 5, wherein the absorbent polymer is included in an amount sufficient to absorb about 60 mL to about 70 mL of saliva.

7. The disposable absorbent pod of claim 1, wherein the porous material further includes at least one additive selected from the group consisting of at least one colorant, at least one deodorant and/or fragrance, at least one disinfectant, germicide and/or antiviral and combinations thereof.

8. The disposable absorbent pod of claim 1, wherein the absorbent pod is biodegradable.

9. The disposable absorbent pod of claim 1, wherein the coating further includes at least one surfactant.

10. The disposable absorbent pod of claim 1, wherein the mucolytic agent is a proteolytic enzyme.

11. The disposable absorbent pod of claim 1, wherein the porous material has a wet tensile strength with the polymer orientation in Machine Direction (MD) of up to about 4,000 g/in and a wet tensile strength with the polymer orientation in Cross Direction (CD) of up to about 1,100 g/in, and wherein the porous material has a dry tensile strength MD of up to about 3,700 g/in and a dry tensile strength CD of up to about 900 g/in.

12. The disposable absorbent pod of claim 1, wherein the pouch contains the absorbent polymer before, during and after saturation thereof or the pouch contains the absorbent polymer before use releases the absorbent polymer as saliva is absorbed.

13. The disposable absorbent pod of claim 1, wherein the pouch includes a top, a bottom and at least one sidewall or water soluble seal joining the top to the bottom.

* * * * *